(12) United States Patent
Poulin

(10) Patent No.: US 8,751,133 B2
(45) Date of Patent: Jun. 10, 2014

(54) SPEED LIMITER SYSTEM AND METHOD FOR A VEHICLE

(75) Inventor: Jean Poulin, Varennes (CA)

(73) Assignee: 7980302 Canada Inc., Ste-Julie, Quebec (CA)

( * ) Notice: Subject to any disclaimer, the term of this patent is extended or adjusted under 35 U.S.C. 154(b) by 295 days.

(21) Appl. No.: 13/398,537

(22) Filed: Feb. 16, 2012

(65) Prior Publication Data

US 2012/0215416 A1 Aug. 23, 2012

Related U.S. Application Data

(60) Provisional application No. 61/457,279, filed on Feb. 17, 2011.

(51) Int. Cl.
| | |
|---|---|
| *B60T 8/32* | (2006.01) |
| *B60W 40/00* | (2006.01) |
| *B60W 40/105* | (2012.01) |
| *G01P 3/56* | (2006.01) |

(52) U.S. Cl.
CPC .............. *B60W 40/00* (2013.01); *B60W 40/105* (2013.01); *G01P 3/56* (2013.01)
USPC .............. 701/93; 701/110; 701/409; 700/304

(58) Field of Classification Search
CPC ........ G01P 3/56; B60W 40/00; B60W 40/105
USPC ............................. 701/93, 110, 409; 700/304
See application file for complete search history.

(56) References Cited

U.S. PATENT DOCUMENTS

| | | | | |
|---|---|---|---|---|
| 6,161,072 | A * | 12/2000 | Clapper | 701/93 |
| 6,462,675 | B1 * | 10/2002 | Humphrey et al. | 340/905 |
| 7,739,036 | B2 * | 6/2010 | Grimm et al. | 701/420 |
| 8,255,155 | B1 * | 8/2012 | Crane et al. | 701/409 |
| 2003/0187573 | A1 * | 10/2003 | Agnew et al. | 701/201 |
| 2004/0107037 | A1 * | 6/2004 | Straub | 701/93 |
| 2004/0210375 | A1 * | 10/2004 | Heyse | 701/93 |
| 2005/0065687 | A1 * | 3/2005 | Hijikata et al. | 701/41 |
| 2005/0110348 | A1 * | 5/2005 | Hijikata et al. | 307/10.1 |
| 2007/0239331 | A1 * | 10/2007 | Kaplan | 701/36 |
| 2008/0252487 | A1 * | 10/2008 | McClellan et al. | 340/936 |
| 2009/0146844 | A1 * | 6/2009 | Hassan | 340/936 |
| 2010/0045452 | A1 * | 2/2010 | Periwal | 340/439 |
| 2010/0217494 | A1 * | 8/2010 | Heft et al. | 701/70 |

(Continued)

FOREIGN PATENT DOCUMENTS

| | | | | |
|---|---|---|---|---|
| CN | 201035759 | * | 3/2008 | G08G 1/00 |
| GB | 2458513 A | * | 9/2009 | G08G 1/052 |
| JP | 2009062818 | * | 3/2009 | F02D 29/02 |
| WO | WO2012166059 A2 * | 6/2012 | | |

OTHER PUBLICATIONS

Machine English-translation of JP 2009-062818 published Mar. 26, 2009.*

*Primary Examiner* — Calvin Cheung
(74) *Attorney, Agent, or Firm* — Equinox IP; Franz Bonsang

(57) ABSTRACT

A speed limiter method and system that automatically limits the maximum speed of a motor vehicle based on the segment of the road the vehicle is travelling on and on the user or driver of the vehicle, by modifying an actual throttle sensor signal from the throttle position sensor of the vehicle transmitted to the engine control unit.

17 Claims, 2 Drawing Sheets

(56) References Cited

U.S. PATENT DOCUMENTS

| | | | |
|---|---|---|---|
| 2010/0332114 A1* | 12/2010 | Jung | 701/200 |
| 2012/0005180 A1* | 1/2012 | Chen | 707/705 |
| 2013/0245945 A1* | 9/2013 | Morita et al. | 701/533 |
| 2013/0317730 A1* | 11/2013 | Van Laethem et al. | 701/119 |

* cited by examiner

SPEED LIMITER SYSTEM AND METHOD FOR A VEHICLE

CROSS-REFERENCE TO RELATED APPLICATIONS

This application claims priority of U.S. Provisional Application for Patent No. 61/457,279 filed Feb. 17, 2011, the contents of which is incorporated herein in its entirety by reference.

FIELD OF THE INVENTION

The present invention relates to a speed limiter system and method for a vehicle, and is more particularly concerned with a speed limiter system and method for a vehicle which controls in real time the output of an engine of a vehicle to regulate the maximum speed thereof.

BACKGROUND OF THE INVENTION

Systems and methods for limiting the speed of a motor vehicle, for fuel economy and other purposes are well known in the art. For example, United States patent publication number 2009/0146844 A1, dated Jun. 11, 2009 in the name of Hassan teaches an intelligent electronic top speed control automotive safety device which controls and adjusts the maximum speed (top speed) allowed of any vehicle, in real time, based on the posted speed limit on the specific segment of the road the vehicle is travelling on using available GPS navigation technology and a custom software application acting on the vehicle ECU (engine control unit). The maximum speed is the posted speed limit on the segment of the road the vehicle is travelling on increased by a predetermined parameter (or effectively decreased if the predetermined parameter is negative), and this predetermined parameter needs to be programmed into the device prior use thereof.

Accordingly, an improved speed limiter system and method for a vehicle is required.

SUMMARY OF THE INVENTION

It is therefore a general object of the present invention to provide an improved speed limiter system and method that automatically limits the maximum speed of a vehicle based on the segment of the road the vehicle is travelling on.

An advantage of the present invention is that the speed limiter system and method provided thereby does not require modification of the engine control unit of the vehicle.

Another advantage of the present invention is that the speed limiter system and method provided thereby prevents excessive over speeding by the driver without express intervention or knowledge of the driver of the vehicle so as to ensure road safety as well as improved fuel consumption.

A further advantage of the present invention is that the speed limiter system and method provided thereby can includes roads, or road segments that are not usually found in typical road maps used with navigation systems (such as global positioning systems), depending on the user driving the vehicle, such that different users may have different customized speed limit databases.

According to a first aspect of the present invention, there is provided a speed limiter system for limiting the maximum speed of a vehicle, the system comprises:

a user identification device for identifying the user (driver) of the vehicle;

a navigation device for determining an actual position of the vehicle on a road map;

a speed limit database of posted speed limits for respective segments of roads of the road map;

a user database including, for each user, a respective user over-speed parameter corresponding to the respective road segment;

a speed controller device including an allowed maximum speed algorithm connecting to the user identification device, the navigation device, the speed limit database and the user database, the allowed maximum speed algorithm determining in real time an actual allowed maximum speed limit by adding the actual road segment posted speed limit to the corresponding user over-speed parameter;

said speed controller device further connecting to an engine control unit, a vehicle speed source and a throttle position sensor of the vehicle, when the vehicle speed determined from the vehicle speed source is within a predetermined activation range below the actual allowed maximum speed limit, the controller device modifying an actual throttle sensor signal from the throttle position sensor to the engine control unit to prevent the user from driving the vehicle at a speed beyond the actual allowed maximum speed limit.

Conveniently, the controller device further connects to a cruise control interface of the vehicle to further modify an actual cruise control signal from the cruise control interface to the engine control unit, or to prevent an actual cruise control signal of the cruise control interface from reaching the engine control unit and to control the cruise control interface, to prevent the user from driving the vehicle at a speed beyond the actual allowed maximum speed limit.

Optionally, the controller device connects to a customized speed limit database modifying the speed limit database, preferably on a user-dependency basis.

Conveniently, the user identification device includes a data input interface to receive a user identification code from the user, either via a keypad (user identification and/or password) or a wireless device (RFID—radio frequency identification) worn by the driver.

Typically, the speed limiter system prevents starting of the vehicle engine in the absence of a valid user identification, or prevents the vehicle from being displaced by preventing the throttle sensor signal from reaching the engine control unit.

In another aspect of the present invention, there is provided a speed limiting method for limiting the maximum speed of a vehicle depending on the actual position of the vehicle on a road segment and on the user (driver) of the vehicle, the method comprises the steps of:

getting identification of the user (driver) of the vehicle;
getting an actual position of the vehicle on a road segment;
getting a posted speed limit for the road segment;
getting a user over-speed parameter corresponding to the respective road segment;
determining in real time an actual allowed maximum speed limit by adding the actual road segment posted speed limit to the corresponding user over-speed parameter;
upon the vehicle speed reaching a predetermined activation range below the actual allowed maximum speed limit, modifying an actual throttle sensor signal from a throttle position sensor so as to prevent the user from driving the vehicle at a speed beyond the actual allowed maximum speed limit.

Conveniently, the step of getting identification includes either disabling engine start or preventing the actual throttle sensor signal from reaching the electronic control unit, upon getting a non-valid user identification from the user-identification device.

Conveniently, the step of getting a posted speed limit further includes getting a posted speed limit for the road segment from a customized speed limit database and the user database.

Conveniently, the speed limiting method further comprises the step of modifying an actual cruise control signal from a cruise control interface of the vehicle to the engine control unit so as to prevent the user from driving the vehicle at a speed beyond the actual allowed maximum speed limit.

Alternatively, the speed limiting method further comprises the steps of preventing an actual cruise control signal of a cruise control interface from reaching the engine control unit, and controlling the cruise control interface, thereby preventing the user from driving the vehicle at a speed beyond the actual allowed maximum speed limit.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
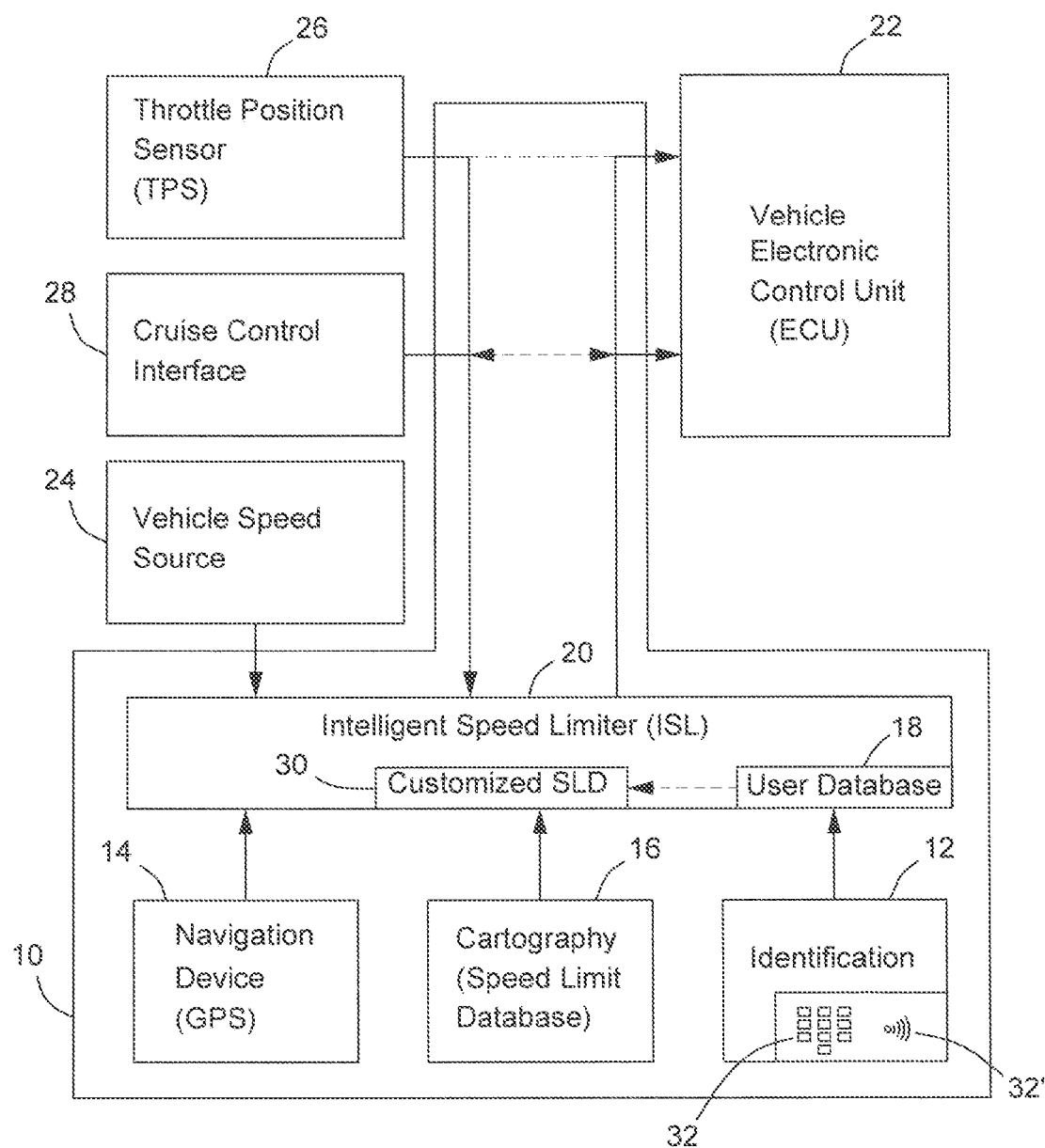
FIG. 1 is a schematic diagram of a speed limiter system in accordance with an embodiment of the invention.

Reference is now made to FIG. 1 which shows a schematic diagram of a speed limiter system, shown generally as 10, in accordance with an embodiment of the invention for limiting the maximum speed of a motor vehicle (not shown), the system typically includes a user identification device 12 for identifying the user (driver) of the vehicle; a navigation device 14, such as a GPS (global positioning system) navigation system, a dead reckoning (DR) algorithm or the like, for determining an actual position of the vehicle on a road map (map matching); and a speed limit database 16, or cartography database (or even provided from an external provider by wireless communication) of posted speed limits for respective segments of roads of the road map network.

A user database 18 typically includes, for each user, a respective user over-speed parameter corresponding to each respective road segment, the user over-speed parameter could be provided by the user for different types of roads or even be dependent on the corresponding posted speed limits, typically provided in the form of a driver speed profile table or the like.

A speed controller device 20 (or intelligent speed limiter) includes an allowed maximum speed algorithm connected to the user identification device 12, the navigation device 14, the speed limit database 16 and the user database 18. The allowed maximum speed algorithm determines in real time an actual allowed maximum speed limit by adding the posted speed limit of the actual road segment, obtained by map matching (matching the GPS data with the speed limit database), to the corresponding user over-speed parameter.

The speed controller device 20 further connects to an engine control unit (ECU) 22 of the vehicle, a vehicle speed source 24 (such as a vehicle speed sensor, data from a vehicle communication bus (OBD2, J1939, J1708) or the like) and a throttle position sensor 26 of the vehicle. When the vehicle speed determined from the vehicle speed source 24 is within a predetermined activation range (or table thereof), such as either an absolute value of typically 5 km/h and preferably 2-3 km/h or a percentage value of typically 5% of the actual allowed maximum speed limit, below the actual allowed maximum speed limit, the controller device 20 modifies the actual throttle sensor signal from the throttle position sensor 26 to the engine control unit 22 to prevent the user from driving the vehicle at a speed beyond the actual allowed maximum speed limit.

Additionally, whenever applicable, the controller device 20 further connects to the cruise control interface 28 to further modify the actual cruise control signal from the cruise control interface 28 to the engine control unit 22 to prevent the user from driving the vehicle at a speed beyond the actual allowed maximum speed limit. Alternatively, the controller device 20 takes over the control of the cruise control from the ECU 22, in allowing the setting of the cruise control at any vehicle speed at or below the actual allowed maximum speed limit.

Optionally, a customized speed limit database 30, defining additional road(s), road segment(s) or even drivable road network of an entire restricted zone area, or the like, usually not shown nor available in typical cartography databases, could be added into the into the speed limiter system 10. Such a customizable speed limit database 30 could eventually be user dependent, depending on the specific needs.

Conveniently, the user identification device 12 includes a data input interface 32 to receive a user identification code from the user, either via a keypad (user identification and/or password) or a wireless device 32' (RFID—radio frequency identification) worn by the driver, or the like.

Furthermore, as a safety feature, the speed limiter system 10 typically prevents the vehicle from being displaced by either preventing the starting of the vehicle engine or by preventing the signal of the throttle position sensor 26 from reaching the engine control unit 22, in the absence of a valid user identification.

Figure 2:
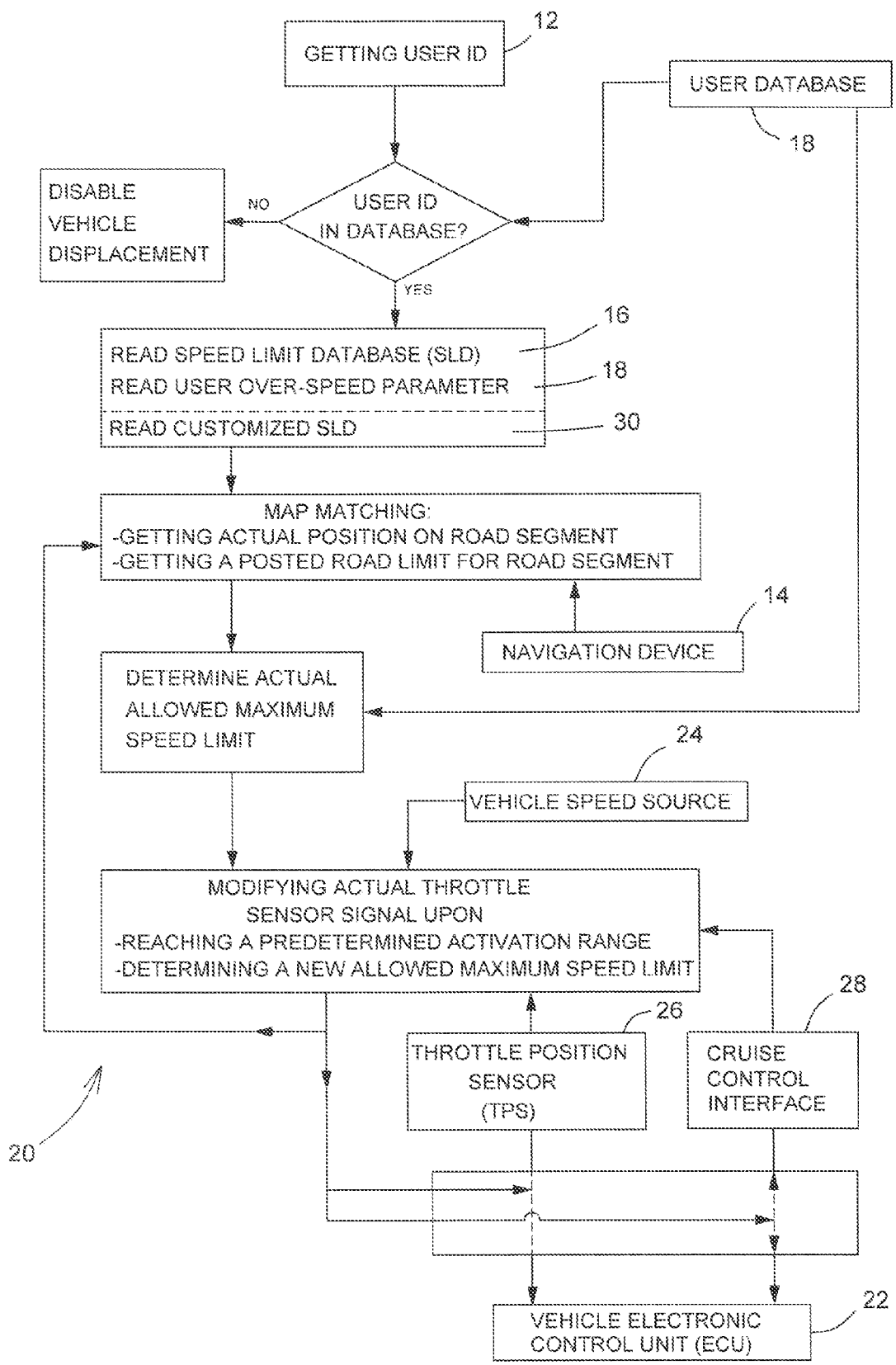
FIG. 2 is a flow diagram of a speed limiting method in accordance with an embodiment of the invention.

In accordance with another aspect of the present invention, as represented in FIG. 2, there is provided a speed limiting method for limiting the maximum speed of a vehicle depending on the actual position of the vehicle on a road segment and on the user (driver) of the vehicle. The method typically comprises the steps of:

getting identification of the user (driver) of the vehicle, from the user identification device 12 or the like;

getting an actual position of the vehicle on a road segment, from the a navigation device 14 or the like;

getting a posted speed limit for the road segment, from the speed limit database 16 or the like (map matching);

getting a user over-speed parameter corresponding to the respective road segment, from the user database 18 or the like;

determining in real time an actual allowed maximum speed limit by adding the actual road segment posted speed limit to the corresponding user over-speed parameter, via the speed controller device 20 or the like;

upon the vehicle speed reaching a predetermined activation range below the actual allowed maximum speed limit, modifying an actual throttle sensor signal from a throttle position sensor so as to prevent the user from driving the vehicle at a speed beyond the actual allowed maximum speed limit, via the speed controller device 20 or the like.

Preferably, the method includes either disabling engine start or preventing the signal of the throttle position sensor 26 from reaching the electronic control unit 22, upon getting a nonvalid user identification from the user-identification device 12.

Also, the method also allows getting a posted speed limit for the road segment from the customized speed limit database 30, preferably connected to the user database 18.

Furthermore, the speed limiting method typically includes the step of modifying an actual cruise control signal from a cruise control interface 28 of the vehicle to the engine control unit 22 in order to prevent the user from driving the vehicle at a speed beyond the actual allowed maximum speed limit. Alternatively, the method includes the steps of preventing an actual cruise control signal of the cruise control interface 28 from reaching the engine control unit 22, and controlling the cruise control interface 28, thereby preventing the user from driving the vehicle at a speed beyond the actual allowed maximum speed limit.

Although the speed limiter system and method provided by the present invention have been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A speed limiter system for limiting the maximum speed of a vehicle, the system comprises:
    a user identification device for identifying the user of the vehicle;
    a navigation device for determining an actual position of the vehicle on a road map;
    a speed limit database of posted speed limits for respective segments of roads of the road map;
    a user database including, for each user, a respective user over-speed parameter corresponding to the respective road segment;
    a speed controller device including an allowed maximum speed algorithm connecting to the user identification device, the navigation device, the speed limit database and the user database, the allowed maximum speed algorithm determining in real time an actual allowed maximum speed limit by adding the actual road segment posted speed limit to the corresponding user over-speed parameter; and
    said speed controller device further connecting to an engine control unit, a vehicle speed source and a throttle position sensor of the vehicle, when the vehicle speed determined from the vehicle speed source is within a predetermined activation range below the actual allowed maximum speed limit, the controller device modifying an actual throttle sensor signal from the throttle position sensor to the engine control unit to prevent the user from driving the vehicle at a speed beyond the actual allowed maximum speed limit.

2. The speed limiter system of claim 1, wherein the controller device further connects to a cruise control interface of the vehicle to further modify an actual cruise control signal from the cruise control interface to the engine control unit to prevent the user from driving the vehicle at a speed beyond the actual allowed maximum speed limit.

3. The speed limiter system of claim 1, wherein the user identification device includes a data input interface to receive a user identification code from the user.

4. The speed limiter system of claim 3, wherein the data input interface includes a keypad.

5. The speed limiter system of claim 3, wherein the data input interface includes a wireless device.

6. The speed limiter system of claim 1, wherein the controller device connects to a customized speed limit database modifying the speed limit database.

7. The speed limiter system of claim 6, wherein the customized speed limit database is user-dependent.

8. The speed limiter system of claim 1, wherein the speed limiter system prevents the vehicle from being displaced in the absence of a valid user identification.

9. The speed limiter system of claim 8, wherein the speed limiter system prevents starting of the vehicle engine in the absence of a valid user identification.

10. The speed limiter system of claim 8, wherein the speed limiter system prevents the actual throttle sensor signal from reaching the engine control unit in the absence of a valid user identification.

11. The speed limiter system of claim 1, wherein the controller device further connects to a cruise control interface of the vehicle to prevent an actual cruise control signal of the cruise control interface from reaching the engine control unit, and to control the cruise control interface, thereby preventing the user from driving the vehicle at a speed beyond the actual allowed maximum speed limit.

12. A speed limiting method for limiting the maximum speed of a vehicle depending on the actual position of the vehicle on a road segment and on the user of the vehicle, the method comprises the steps of:
    getting identification of the user of the vehicle from a user-identification device;
    getting an actual position of the vehicle on a road segment from a navigation device;
    getting a posted speed limit for the road segment from a speed limit database;
    getting a user over-speed parameter corresponding to the respective road segment from a user database;
    determining, via a speed controller device, in real time an actual allowed maximum speed limit by adding the actual road segment posted speed limit to the corresponding user over-speed parameter; and
    upon the vehicle speed reaching a predetermined activation range below the actual allowed maximum speed limit, said speed controller device modifying an actual throttle sensor signal from a throttle position sensor so as to prevent the user from driving the vehicle at a speed beyond the actual allowed maximum speed limit.

13. The speed limiting method of claim 12, wherein the step of getting identification includes disabling engine start upon getting a non-valid user identification from the user-identification device.

14. The speed limiting method of claim 12, wherein the step of getting identification includes preventing the actual throttle sensor signal from reaching the electronic control unit upon getting a non-valid user identification from the user-identification device.

15. The speed limiting method of claim 12, wherein the step of getting a posted speed limit further includes getting a posted speed limit for the road segment from a customized speed limit database and the user database.

16. The speed limiting method of claim 12, further comprising the step of modifying an actual cruise control signal from a cruise control interface of the vehicle to the engine control unit so as to prevent the user from driving the vehicle at a speed beyond the actual allowed maximum speed limit.

17. The speed limiting method of claim 12, further comprising the steps of preventing an actual cruise control signal of a cruise control interface from reaching the engine control unit, and controlling the cruise control interface, thereby preventing the user from driving the vehicle at a speed beyond the actual allowed maximum speed limit.

\* \* \* \* \*